(No Model.)

W. T. LEWIS.
BRAKE FOR BICYCLES.

No. 478,194. Patented July 5, 1892.

Witnesses.
A. Keithley
F. L. Rozelle

Inventor
William T. Lewis —
By L. M. Thurlow
Atty.

UNITED STATES PATENT OFFICE.

WILLIAM T. LEWIS, OF PEORIA, ILLINOIS.

BRAKE FOR BICYCLES.

SPECIFICATION forming part of Letters Patent No. 478,194, dated July 5, 1892.

Application filed September 16, 1891. Serial No. 405,828. (No model.)

*To all whom it may concern:*

Be it known that I, WILLIAM T. LEWIS, a citizen of the United States, residing at Peoria, in the county of Peoria and State of Illinois, have invented certain new and useful Improvements in Brakes for Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in brakes for bicycles.

The object of the invention is to provide a spherical body of wood, rubber, or other suitable material, (rubber being preferable,) which is allowed to revolve upon an axis and which bears on the rubber tire of the wheel of a bicycle or other vehicle to accomplish the purpose for which it is intended. By this means the tire is not worn out or cut, as is the case when using ordinary brakes on machines of this class.

Figure 1:
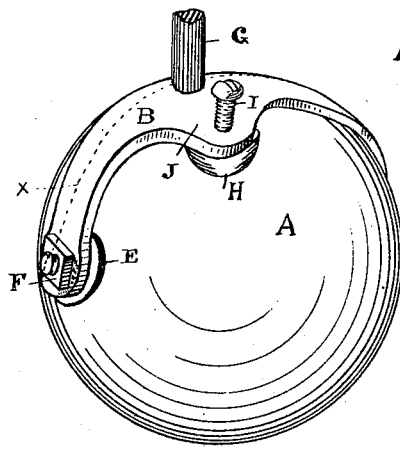
Figure 2:
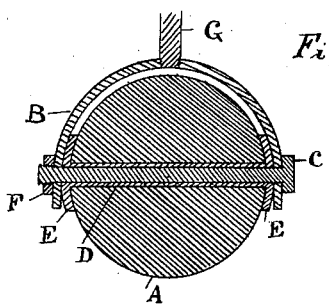
Figure 3:
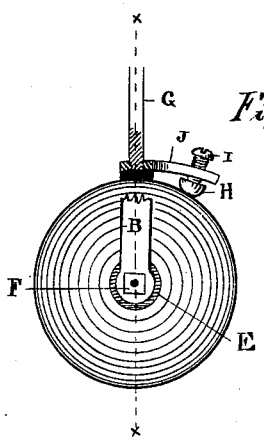
Figure 4:
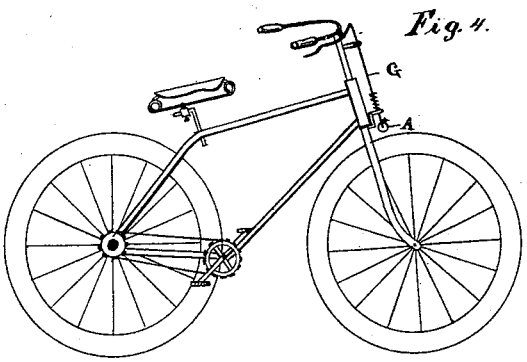

In the drawings presented herewith, Figure 1 represents a perspective view of the brake as detached from the wheel. Fig. 2 is a sectional view of the same through dotted line *x*, Figs. 1 and 3. Fig. 3 is an end view of a yoke carrying the axle on which the ball revolves and showing a portion of the said yoke broken away to show construction. Fig. 4 is a side elevation of a bicycle with the ball-brake mounted thereon for engagement with the wheel.

A represents a ball of rubber, through the center of which is cut a circular hole, through which is passed a tube D. This tube is somewhat longer than the diameter of the ball, and after said tube D is forced into its place a washer E is placed on each end thereof, and the ends of the tube are then bent over and riveted against the washers or brazed thereto. By this means it will be seen that the ball is provided with a durable and substantial internal bearing, within which is designed to be inserted a bolt C to form an axle on which the ball may revolve. A semicircular yoke of metal B is placed over the ball, as shown, and either end of said yoke is provided with a hole, and when it is let down in place the bolt C before mentioned is thrust through one hole in the yoke, thence through the tube D in ball and through the hole in the opposite end of yoke. A nut or burr F is then placed on the threaded end of the bolt C and the ball is mounted for work.

A very important part of my invention may be understood from the following: A projection J, Figs. 1 and 3, is made integral with the yoke B, and a screw I is let into a threaded hole therein, as shown, and the said screw carries on its lower extremity a semicircular ball H of suitable material, preferably metal, the use of which will be described in the operation. The device thus constructed is placed on the vehicle thus: The lower extremity of the brake-rod G of the several figures ordinarily used on machines of this class is screwed into the top of the yoke B, as shown, and the device is placed in position on the wheel, as shown in Fig. 4, and is used the same as an ordinary brake.

The operation is as follows: When the brake-rod is depressed, the brake-ball A is forced downward against the tire of the wheel, and as the ball is smaller than the wheel it exerts a considerable amount of resistance in revolving, and to give further resistance to the wheel the screw I is turned in a direction to press the nub H downward against the ball A, so that a certain amount of binding on the said ball is the result. This device after being given a fair trial is bound to give perfect satisfaction in "braking," and at the same time to save the wearing of the tire, which is of importance.

The invention may be used alike on solid, cushion, and pneumatic tired machines, and also two or more balls may be used as well as one in the construction of this device.

I claim—

1. In a brake for bicycles, the ball A, provided on its interior with a metal tube D, with washers E on either end thereof, and mounted on an axle C, in combination with the yoke B, projection J, screw I, and button H, as herein set forth and described.

2. In a brake for bicycles, the ball A, in combination with the yoke B, provided with the projection J, screw I, and button H, substantially as set forth and described.

3. In a brake for bicycles, the yoke B, with the projection J, through which passes the screw I, with its button H, in combination with the ball A, substantially as herein set forth and described.

4. In a brake for bicycles, one or more balls A, provided on their interiors with the metal tube or tubes D, with washers E, in combination with the yoke B, with its projection J, through which passes the screw I, with its button H, substantially as set forth.

In testimony whereof I affix my signature in presence of two witnesses.

WILLIAM T. LEWIS.

Witnesses:
F. O. CUNNINGHAM,
C. B. McDOUGAL.